United States Patent
Schruefer et al.

(10) Patent No.: US 10,775,162 B2
(45) Date of Patent: Sep. 15, 2020

(54) PNEUMATIC PLUG GAUGE AND MEASURING SYSTEM

(71) Applicant: Robert Bosch GmbH, Stuttgart (DE)

(72) Inventors: Andreas Schruefer, Waischenfeld (DE); Christoph Schmidtlein, Hetzles (DE); Herbert Beck, Hirschaid-Sassanfahrt (DE); Johannes Weickmann, Forchheim (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 15/533,703

(22) PCT Filed: Oct. 27, 2015

(86) PCT No.: PCT/EP2015/074888
§ 371 (c)(1),
(2) Date: Jun. 7, 2017

(87) PCT Pub. No.: WO2016/091448
PCT Pub. Date: Jun. 16, 2016

(65) Prior Publication Data
US 2017/0328707 A1  Nov. 16, 2017

(30) Foreign Application Priority Data
Dec. 8, 2014 (DE) .................... 10 2014 225 169

(51) Int. Cl.
*G01B 13/18* (2006.01)
*B21D 5/02* (2006.01)
(Continued)

(52) U.S. Cl.
CPC ............. *G01B 13/18* (2013.01); *B21D 5/006* (2013.01); *B21D 5/0209* (2013.01); *G01B 5/012* (2013.01)

(58) Field of Classification Search
CPC ........ G01B 13/18; G01B 13/00; G01B 5/012; B21D 5/006; B21D 5/0209; Y10S 33/02; Y10S 72/702
See application file for complete search history.

(56) References Cited

U.S. PATENT DOCUMENTS 3,046,778 A * 7/1962 Fortier .................. G01B 13/00
73/37.5
5,099,666 A * 3/1992 Sartorio ............... B21D 5/0209
72/18.1

(Continued)

FOREIGN PATENT DOCUMENTS

| DE | 3942207 | 6/1991 |
| DE | 10302055 | 8/2004 |
| EP | 2378240 | 10/2011 |

OTHER PUBLICATIONS

International Search Report for Application No. PCT/EP2015/074888 dated Jan. 8, 2016 (English Translation, 2 pages).

*Primary Examiner* — Randy W Gibson
*Assistant Examiner* — Gedeon M Kidanu
(74) *Attorney, Agent, or Firm* — Michael Best & Friedrich LLP

(57) ABSTRACT

A pneumatic plug gauge has been developed in the context of the invention. This plug gauge comprises a first measuring channel which can be connected to a pressure medium source and opens into a first outlet for the pressure medium, which outlet can be directed to a surface of the workpiece to be tested. According to the invention, this plug gauge is designed to determine the tilt angle between a section on the surface thereof and a region opposite this section on the surface of the workpiece by virtue of the first outlet being arranged at one end of the section and at least one second outlet being provided, which second outlet is arranged at the other end of the section. It has been recognized that the (Continued)

admittedly high precision of pneumatic length measurements can be converted in a particularly advantageous manner to high precision of the angle measurement in this manner. The tilt angle can be measured at least with an accuracy of less than one tenth of a degree. At the same time, the measurement is fast enough for 100% control in mass production. The plug gauge is the central element in the measuring system and in the method, to which the invention likewise relates.

21 Claims, 1 Drawing Sheet

(51) Int. Cl.
     *G01B 5/012*      (2006.01)
     *B21D 5/00*      (2006.01)

(56) References Cited

U.S. PATENT DOCUMENTS

| | | | | |
|---|---|---|---|---|
| 5,148,693 A * | 9/1992 | Sartorio | ............... | B21D 5/0209 |
| | | | | 72/18.1 |
| 5,584,199 A * | 12/1996 | Sartorio | ............... | B21D 5/0209 |
| | | | | 72/18.6 |
| 6,553,803 B1 * | 4/2003 | Heingartner | ........... | G01B 13/18 |
| | | | | 72/31.1 |
| 6,922,903 B2 * | 8/2005 | Horn | ...................... | B21D 5/002 |
| | | | | 33/1 N |
| 2011/0247228 A1 * | 10/2011 | Stamenkovic | ......... | G01B 13/00 |
| | | | | 33/503 |

* cited by examiner

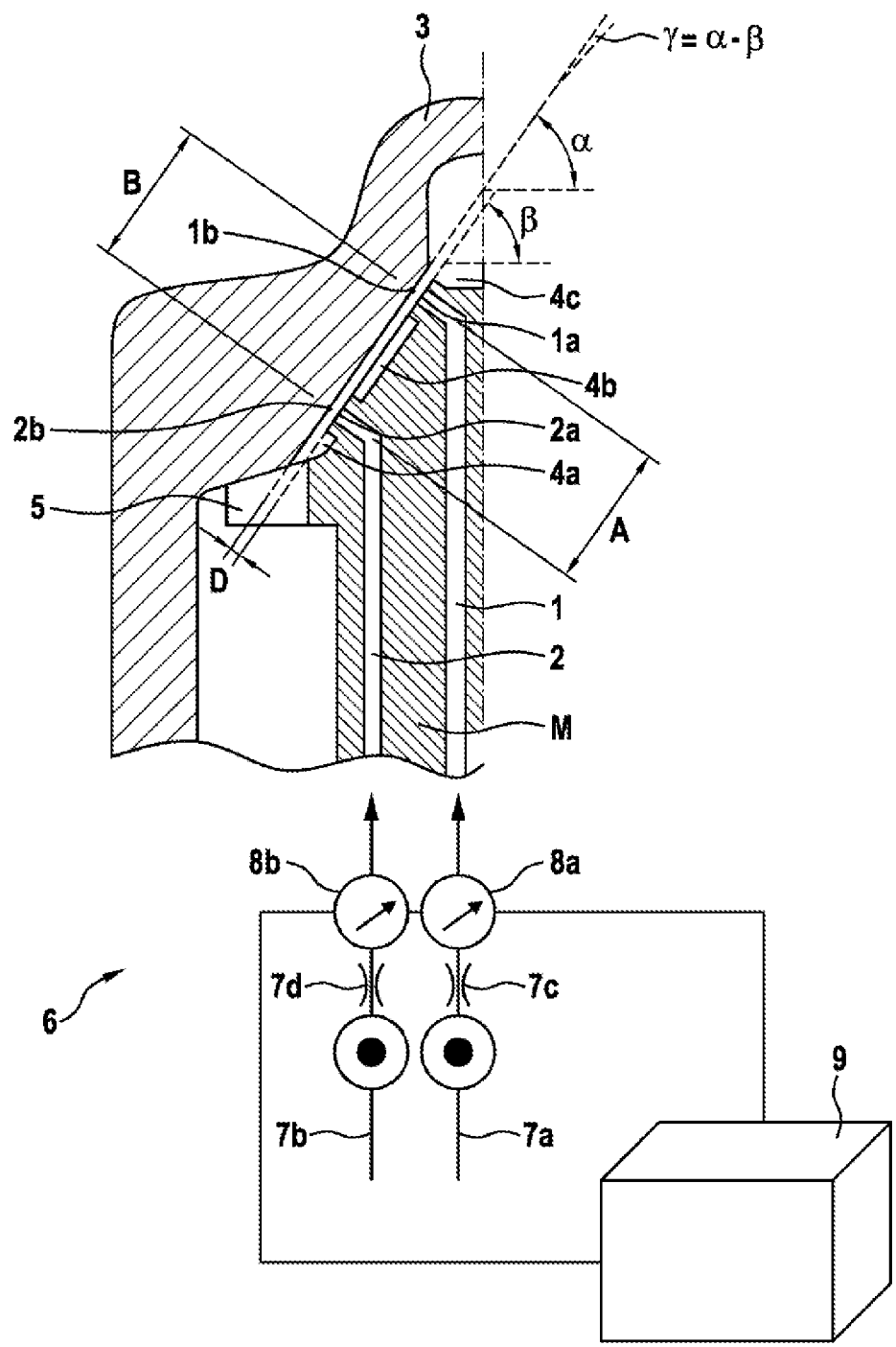

PNEUMATIC PLUG GAUGE AND MEASURING SYSTEM

BACKGROUND OF THE INVENTION

The present invention concerns a plug gauge and a measurement system for highly accurate pneumatic angle measurement.

In technical systems carrying a fluid flow, lines and/or bores with different, partly conical cross-sections are often to be found. Here the opening angle of the conical or cylindrical bore components are often functionally critical. Examples of this are the seat angle on a common rail injection nozzle or on GS high pressure injection valves.

Further examples are the feed or outlet bores in hydraulic pumps or switching valves.

It is particularly problematic here that to an increasing extent bores are no longer bound to be introduced by tools, i.e. by means of drills. Instead, methods such as laser drilling, grinding or moving erosion are used, with which the correct opening angle is no longer automatically guaranteed by the geometry of the tool. There is therefore an increasing need to check functionally critical opening angles very accurately with a tolerance of a few tenths of degrees.

For this purpose, mainly tactile systems are currently used, such as for example a Diatest double gauge according to the document DE 39 42 207 A1, or optical systems, such as for example a fiber optic interferometer according to the document DE 103 02 055 A1. Tactile systems can mechanically damage the workpiece to be checked and are relatively inaccurate. Optical systems require a lot of space and are very expensive; thus, a white light interferometer costs up to 200,000 €. The gravest disadvantage is, however, that the time required for the measurements is too long in order to be able to check each individual workpiece during mass production. The time available is only sufficient for sampling.

SUMMARY OF THE INVENTION

It is therefore the object of the invention to simplify and accelerate highly accurate angle measurements so that they are practical for seamless quality control during mass production.

Within the context of the invention, a pneumatic plug gauge was developed. This comprises a first measurement channel that can be connected to a source of a pressure medium and opens at a first outlet for the pressure medium on that can be directed at a surface of the workpiece to be checked.

According to the invention, said plug gauge is designed for determining the angle of inclination between a path on the surface thereof and a region opposite said path on the surface of the workpiece by disposing the first outlet at one end of the path and by providing at least one second outlet that is disposed at the other end of the path. The path does not necessarily have to be straight. If the plug gauge is conical for example, the two outlets can also be offset azimuthally relative to each other, so that the shortest path between them that also functions as a path is curved.

It has been recognized that in this way the acknowledged high precision of the pneumatic length measurements can be converted in a particularly advantageous manner into high precision of the angle measurement. By subjecting both outlets to the pressure medium at the same time or alternately, the distances between the first outlet and the region on the surface of the workpiece opposite the first outlet as well as between the second outlet and the surface of the workpiece opposite said second outlet can be determined. Each outlet forms a choke point in combination with the surface of the workpiece that hinders the free discharge of the pressure medium (for example air). As a result, a back pressure or a defined flow builds up in the measurement channel that changes the pressure in the measurement channel. The pressure in the measurement channel can be measured as a measure of the respective distance between the outlet and the surface of the workpiece.

Such a plug gauge can be used for measuring diverse internal geometries and angles between 0° and 179° aperture. It is constructed so compactly that it can also be inserted into very small bores. Such very small bores can for example have a diameter between 15 µm and 1.5 mm. The angle can also be measured on short paths of less than 1.5 mm in length. Because pneumatic length measurements with sub micrometer accuracy are possible and also allow guide play of less than a micrometer to be achieved during insertion of the plug gauge into a bore, the angle of inclination can be measured with an accuracy of less than a tenth of a degree.

Furthermore, with optical and especially tactile measurements, the accuracy achievable during real operations often falls short of the theoretical maximum possible accuracy, because the results are drastically distorted by oil and other contaminants or production residues. With the pneumatic measurement according to the invention, oil and other contaminants are automatically blown out by the discharged pressure medium, so that said error sources are eliminated.

If both outlets are alternately subjected to the pressure medium, a single measurement channel is sufficient for both outlets. Advantageously however, the plug gauge contains a second independent measurement channel that opens at the second outlet. Both outlets can then be subjected to the pressure medium at the same time and mutually independently. Assuming that the flows of pressure medium produced by the two outlets do not hinder each other, the respective distance from the surface of the workpiece can also be pneumatically measured at both outlets at the same time.

Advantageously, the pneumatic plug gauge contains at least one opening, into which the pressure medium can penetrate through the intermediate space between the workpiece and the outlet and can then flow out unchoked. The flow of pressure medium from the outlet is then only choked by the distance of the outlet from the surface of the workpiece. As a result, the change in pressure in the measurement channel also depends only on said distance. In particular, there is a range of distances in which the change in pressure is approximately linear with the distance, which significantly simplifies further analysis.

In a particularly advantageous embodiment of the invention, the path between the two outlets leads over at least one such opening. The minimum distance that the two outlets must be from each other so that the flows of pressure medium emanating from the two outlets do not hinder each other is then reduced. The smaller is said distance, the more delicate is the workpieces that can be measured.

Advantageously, the plug gauge comprises at least one stop for contact with the workpiece. Said stop can for example have three or more vanes. The plug gauge can then be brought by self-adjustment into a defined position and orientation relative to the workpiece, so that a particularly clear reference system results for the absolute value of the measured angle.

In a particularly advantageous embodiment of the invention, the plug gauge is of a conical form, at least in the region in which the path between the two outlets runs. In that case, it is particularly suitable for examining conical bores. The opening angle of the cone should deviate by no more than 1°, preferably by no more than 0.5°, from the nominal opening angle of the manufactured bore that is to be examined. In this working region, the difference between the pressure changes produced at both outlets as a result of choking by the adjacent workpiece varies approximately linearly with the angle of inclination.

The measurement system according to the invention for determining an angle at a surface of a workpiece comprises, in addition to the pneumatic plug gauge according to the invention, at least one source of a pressure medium with a choked output leading to the outlets as well as at least one pressure measuring device that is connected between the output and the outlets. If there are two measurement channels, advantageously a specific choked output and a specific pressure measuring device are provided for each measurement channel.

If a measurement channel is subjected to a pressure medium and there is no workpiece in the vicinity of the outlet, the pressure medium can flow out freely. Behind the choked output, therefore, the pressure recorded by the pressure measuring device falls almost to the ambient pressure. If on the other hand the outflow of the pressure medium from the outlet is highly choked by the workpiece, the recorded pressure rises almost to the pressure that is delivered by the pressure medium source.

In a further advantageous embodiment of the invention, means for alternately subjecting the two outlets to the pressure medium are provided. In that case the flows of pressure medium emanating from both outlets from the outset do not affect each other. Hence a lower limit is no longer set for the distance between the outlets. More delicate workpieces can be examined.

In a particularly advantageous embodiment of the invention, the pressure measuring device is connected to an analysis unit that can determine the angle sought from the measured pressures. In particular, a function rule (calibration or adjustment) can be stored in said analysis unit that associates the measured pressures or pressure differences with an angle of inclination. Depending on the degree of detail of said function rule, the measuring range of the measurement system can be extended to ranges of angles of inclination in which the relationship of the angle of inclination to the pressure or the pressure difference is no longer linear.

In general, the invention also concerns a method for pneumatically determining an angle of inclination between a path in space and a region on the surface of a workpiece to be checked that is opposite said path. The path does not necessarily have to be straight, but can also be a curved path, which for example runs on the surface of a cone. A pneumatic plug gauge that comprises at least one measurement channel is used with the method. The measurement channel is subjected to a pressure medium via a choked output of a pressure medium source and opens at an outlet that is directed towards the surface of the workpiece.

According to the invention, at both points of the path the pressure between the output of the pressure medium source and the outlet of the measurement channel is measured.

Said pressure is determined by a back pressure or by a change in pressure caused by a constant flow in the measurement channel. The back pressure or the change in pressure by the flow is due to the throttling of the flow of pressure medium emanating from the outlet through the vicinity of the workpiece. It is a measure of the distance between the outlet and the surface of the workpiece. If the path A is known accurately, the angle sought uniquely results from the measurements of the distance from the surface of the workpiece at both points of the path A.

Said measurement can be carried out particularly simply with a plug gauge according to the invention or a measurement system according to the invention. Alternatively however, a plug gauge with only one outlet can also be used, wherein said outlet is initially moved to the first point of the path and then to the second point of the path. In that case, the plug gauge can be built even smaller and can be inserted into yet more delicate workpiece geometries. The price thereof is that the method must be carried out very precisely at both points of the path. Suitable positioning systems are, however, available in the marketplace.

Advantageously, the path in space is oriented parallel to the surface of the workpiece to within an angle of a maximum of 1°, preferably to within an angle of a maximum of 0.5°. If for example a workpiece with a conical bore is to be checked, conical plug gauges with an opening angle that is closest to the nominal opening angle of the bore to be checked can be selected from a tool set.

The main application areas of the invention are series investigations of nominally identical workpieces in mass production. Here a change of tool to another plug gauge is only necessary relatively infrequently.

The proper orientation of the path causes the difference between the measured pressures at both points of the path to vary approximately linearly with the angle of inclination sought.

Advantageously, the measurement channel is subjected to a pressure between 2 and 4 bar. The most common pressure for pneumatic length measurements lies around 3 bar. The outlet is guided to the surface of the workpiece at a distance of between 10 µm and 40 µm, preferably between 20 µm and 30 µm, at both points of the path. In said working region, the linearity of the change in pressure produced in the measurement channel to the distance between the outlet and the workpiece is most pronounced. Thus, a highly accurate angle measurement is possible, wherein a function rule (calibration or adjustment) that leads from the change in pressure to the angle of inclination can be obtained with particularly little effort.

Advantageously, after subjecting the measurement channel to the pressure medium, the pressure is only measured or delivered for further analysis when it has settled to a stationary state. This typically takes less than 10 seconds.

The invention is not limited to two measurement channels and outlets. To the extent allowed by the installation space, more measurement channels and outlets can also be used. As a result, the number of reference points for the angle measurement increases, and moreover a contour measurement of the surface of the workpiece is enabled. Similarly, when using only one outlet along the path in space, more than just two points can be approached.

If the plug gauge is rotation symmetrical, for example conical, it can be rotated so that the angle of inclination of the surface of the workpiece can be measured as a function of the angle of rotation. During said rotation, the plug gauge can for example be supported on the stop thereof. Such angle-dependent measurements are particularly valuable for the examination of bores that are produced with eroding production methods. Instead of rotation of the plug gauge, further outlets can be provided along an outer circumference of the plug gauge.

BRIEF DESCRIPTION OF THE DRAWING

Further measures that improve the invention are represented below using a FIGURE together with the description of the preferred exemplary embodiment of the invention:

EXEMPLARY EMBODIMENT

In the FIGURE:

FIG. 1: shows an exemplary embodiment of the measurement system according to the invention.

DETAILED DESCRIPTION

According to FIG. 1, a plug gauge M is the central element in the measurement system 6 according to the invention. The plug gauge has two measurement channels 1 and 2 that open at outlets 1a and 2a. The outlets 1a and 2a bound openings 4a, 4b and 4c, which are in the form of peripheral grooves in the surface of the plug gauge. The path A between the two outlets 1a and 2a leads over the opening 4b here.

During the operation of the measurement system, the plug gauge M with the three-vane stop 5 thereof is supported on the workpiece 3. In that case the outlet 1a lies opposite a region 1b on the surface of the workpiece. Similarly, the outlet 2a lies opposite a region 2b on the surface of the workpiece. Overall, the path A thus lies between the two outlets opposite the region B on the surface of the workpiece. The shortest distance between the outlets 1a and 2a on the one hand and the surface of the workpiece 3 on the other hand is characterized by the letter D.

The measurement channel 1 is subjected to compressed air by means of a pressure medium source 7a with a choked output 7c. Compressed air as the pressure medium has the advantage that it does not have to be disposed of after use nor returned to a reservoir. A pressure measuring device 8a is disposed between the choked output 7c and the outlet 1a. Similarly, the second measurement channel 2 is supplied with pressure by a pressure medium source 7b with a choked output 7d. The pressure between the output 7d and the outlet 2a is measured with a second pressure measuring device 8b. The pressures measured by the two measuring units 8a and 8b are delivered to an analysis unit 9, which determines the angle of inclination between the path A and the region B on the surface of the workpiece from the difference of the two pressures.

The examined workpiece 3 has a conical bore with an opening angle $\alpha$. The plug gauge M is also conical at the end thereof with an opening angle $\beta$, which corresponds to a target value for the angle a that is predetermined during the manufacture of the workpiece 3. The measured angle of inclination $\gamma$ corresponds to the difference $\alpha$-$\beta$ between the actual value of the angle $\alpha$ and the target value $\beta$ thereof. It is shown greatly exaggerated in FIG. 1.

The invention claimed is:

1. A pneumatic plug gauge (M), comprising:
   a first measurement channel (1) that is configured to be connected to a pressure medium source (7a, 7b) and that opens into a first outlet (1a) for the pressure medium that can be directed at a surface of a workpiece to be checked (3),
   wherein the plug gauge (M) is configured for determining the angle of inclination ($\alpha$-$\beta$) between a path (A) on a surface of the plug gauge (M) and a region (1b, 2b, B) on the surface of the workpiece (3) opposite said path (A) by the first outlet (1a) being disposed at one end of the path (A) and by the first outlet (1a) being movable to the other end of the path (A) or at least one second outlet (2a) being provided that is disposed at the other end the path (A), characterized in that the plug gauge is of a rotation symmetrical form about an axis of rotation, and wherein the plug gauge has a circular cross-section perpendicular to the axis of rotation, and wherein the plug gauge is of a conical form, at least in a region in which the path (A) runs between the first outlet (1a) and the at least one second outlet (2a).

2. The pneumatic plug gauge (M) as claimed in claim 1, characterized in that a second independent measurement channel (2) is provided that opens at the second outlet (2a).

3. The pneumatic plug gauge (M) as claimed in claim 1, characterized in that the plug gauge comprises at least one stop (5) for making contact with the workpiece (3).

4. The pneumatic plug gauge (M) as claimed in claim 1, wherein the plug gauge is configured to be rotated about the axis of rotation so that the angle of inclination can be measured as a function of the angle of rotation.

5. The pneumatic plug gauge (M) as claimed in claim 1, wherein the plug gauge has at least an end portion that is conical.

6. The pneumatic plug gauge (M) as claimed in claim 1, further comprising the workpiece (3), wherein the surface of the plug gauge (M) faces away from the axis of rotation, and wherein the surface of the workpiece (3) faces toward the axis of rotation.

7. The pneumatic plug gauge (M) as claimed in claim 1, wherein the pneumatic plug gauge (M) includes only the first outlet (1a), and is configured for determining the angle of inclination ($\alpha$-$\beta$) between the path (A) on the surface of the plug gauge (M) and the region (1b, 2b, B) on the surface of the workpiece (3) opposite said path (A) by the first outlet (1a) being moved to the other end of the path (A).

8. The pneumatic plug gauge (M) as claimed in claim 1, wherein the pneumatic plug gauge (M) is configured for determining the angle of inclination ($\alpha$-$\beta$) between the path (A) on the surface of the plug gauge (M) and the region (1b, 2b, B) on the surface of the workpiece (3) opposite said path (A) by the at least one second outlet (2a) being disposed at the other end the path (A).

9. The pneumatic plug gauge as claimed in claim 1, characterized in that the plug gauge has at least one opening (4a, 4b, 4c), into which the pressure medium can penetrate via an intermediate space (D) between the workpiece (3) and the outlet (1a, 2a) and can then flow out unchoked.

10. The pneumatic plug gauge (M) as claimed in claim 3, characterized in that the path (A) between the two outlets (1a, 2a) leads over at least one opening (4b).

11. A measurement system (6) for determining an angle ($\alpha$-$\beta$) on a surface of a workpiece (3), comprising a pneumatic plug gauge (M) as claimed in claim 1, at least one pressure medium source (7a, 7b) with a choked output (7c, 7d) leading to the outlets, and at least one pressure measuring device (8a, 8b) connected between the output and the outlets.

12. The measurement system (6) as claimed in claim 11, characterized in that means are provided for alternately subjecting the two outlets (1a, 2a) to the pressure medium.

13. The measurement system (6) as claimed in claim 7, characterized in that the pressure measuring device (8a, 8b) is connected to an analysis unit (9) configured to determine the angle ($\alpha$-$\beta$) from measured pressures.

14. A method for pneumatically determining a tilt angle ($\alpha\beta$) between a path (A) in space and a region (1b, 2b, B) on a surface of a workpiece to be checked (3) opposite said path (A) with a pneumatic, rotation symmetrical plug gauge (M), wherein the plug gauge is rotation symmetrical about an axis of rotation and has a circular cross-section perpendicular to the axis of rotation, and wherein said plug gauge (M) comprises at least one measurement channel (1, 2) that is subjected to a pressure medium by means of a choked output (7c, 7d) of a pressure medium source (7a, 7b) and that opens at an outlet (1a, 2a) that is directed towards the surface of the workpiece (3), and wherein the plug gauge is of a conical form, at least in a region in which the path (A) runs between the outlet (1a, 2a) and at least one second outlet (1a, 2a), the method comprising:

- measuring a respective pressure between the choked output (7c, 7d) of the pressure medium source (7a, 7b) and the outlet (1a, 2a) of the measurement channel (1, 2) at both end points of the path (A) to determine the tilt angle; and
- rotating the plug gauge within the workpiece to measure the tilt angle as a function of the angle of rotation of the plug gauge.

15. The method as claimed in claim 14, characterized in that the path (A) is oriented in space parallel to the surface of the workpiece (3) to within an angle of a maximum of 1 degree.

16. The method as claimed in claim 14, characterized in that the measurement channel (1, 2) is subjected to a pressure between 2 and 4 bar and the outlet (1a, 2a) is guided to the surface of the workpiece (3) at both points of the path (A) at a distance between 10 μm and 40 μm.

17. The method as claimed in claim 14, characterized in that the measurement channel (1, 2) is subjected to a pressure between 2 and 4 bar and the outlet (1a, 2a) is guided to the surface of the workpiece (3) at both points of the path (A) at a distance between 20 μm and 30 μm.

18. The method as claimed in claim 14, wherein the step of rotating includes rotating the plug gauge (M) about the axis of rotation.

19. The method as claimed in claim 14, wherein the plug gauge (M) comprises a first measurement channel (1) that is configured to be connected to a pressure medium source (7a, 7b) and that opens into a first outlet (1a) for the pressure medium that can be directed at the surface of a workpiece to be checked (3), wherein the plug gauge (M) is configured for determining the angle of inclination ($\alpha$-$\beta$) between the path (A) on a surface of the plug gauge (M) and a region (1b, 2b, B) on the surface of the workpiece (3) opposite said path (A) by the first outlet (1a) being disposed at one end of the path (A) and by the first outlet (1a) being movable to the other end of the path (A) or the at least one second outlet (2a) being provided that is disposed at the other end the path (A).

20. The method as claimed in claim 19, the method further comprising carrying out the method using at least one pressure medium source (7a, 7b) with a choked output (7c, 7d) leading to the outlets, and at least one pressure measuring device (8a, 8b) connected between the output and the outlets.

21. The method as claimed in claim 19, wherein the surface of the plug gauge (M) faces away from the axis of rotation, and wherein the surface of the workpiece (3) faces toward the axis of rotation.

\* \* \* \* \*